United States Patent
Chen et al.

[11] Patent Number: 6,152,340
[45] Date of Patent: Nov. 28, 2000

[54] FAST DEMOUNTABLE STRUCTURE FOR CARRIER BASKET OF STROLLER

[75] Inventors: Er-Jui Chen; Chih-Jung Chang, both of Tai Pao, Taiwan

[73] Assignee: Link Treasure Limited, Virgin Islands (Br.)

[21] Appl. No.: 09/323,757

[22] Filed: Jun. 1, 1999

[51] Int. Cl.$^7$ ...................................................... B60R 9/00
[52] U.S. Cl. .......................... 224/409; 224/430; 224/431; 280/642
[58] Field of Search ..................................... 224/409, 281, 224/538, 547, 548, 555, 558, 564, 570, 430, 431, 435; 280/642, 658, 644; 297/188.08, 188.2, 188.11, 188.12; 211/126.15; 248/250, 229.16, 229, 17

[56] References Cited

U.S. PATENT DOCUMENTS

| | | | |
|---|---|---|---|
| 4,346,912 | 8/1982 | Habib | 280/644 |
| 4,930,697 | 6/1990 | Takahashi et al. | 224/275 |
| 5,271,540 | 12/1993 | Katz et al. | 224/430 |
| 5,765,855 | 6/1998 | Chiu | 280/642 |

*Primary Examiner*—Gregory M. Vidovich
*Assistant Examiner*—Maerena W. Brevard
*Attorney, Agent, or Firm*—W. Wayne Liauh

[57] ABSTRACT

The present invention concerns a fast demountable structure for the carrier basket of a stroller, which is adapted for use in mounting on or dismounting from the frame of a stroller. The carrier basket is mounted on the stroller in a demountable way. A fixture rack is installed for the fixation of the carrier basket on the frame of the stroller, and there are several clasp members being installed on the fixture rack and the frame of the stroller. By the adaptation of at least three clasp members in the relation of 3 points support, the carrier basket can be either fixed onto a clasping position on the frame or moved to a relieving position by the relief from the grasp of the clasp members, and users can take the carrier basket directly from the relieving position. The present invention is adapted for the application to strollers with the collapsible type, and especially in case that the users want to fold the stroller when the carrier basket is full of matters therein.

9 Claims, 6 Drawing Sheets

6,152,340

FAST DEMOUNTABLE STRUCTURE FOR CARRIER BASKET OF STROLLER

FIELD OF THE INVENTION

The present invention relates to a fast demountable structure for a carrier basket of a stroller, and in particular to a demountable carrier basket of a collapsible stroller for convenient use.

BACKGROUND OF THE INVENTION

The present structure of the stroller as known to the art comprises a frame, a seat, and wheels. There are two different types by taking into the consideration of the structure of the frame, one being fixed type and the other collapsible type. The fixed type frame of the stroller is fixedly assembled and cannot be folded; however, the joints in the collapsible type frame is designed to be movable and thereby the frame can be folded after use to save the space. The stroller can be added with other accessory kits under the user's demand such as toy carrier or carrier basket. The toy carrier can bear several toys of infant's preference, by which the attention of babies can be attracted and calmed down. While the carrier basket is adapted for use for the provision of convenience and obviation of the need to use carrier bags or carrier handcarts when one goes out for shopping.

For a stroller with the carrier basket, the basket is usually installed on the under rear of the frame (the space of the under rear of the seat close to the user); thereby the user can push the stroller moving, with ease while putting the purchased matters into the carrier basket in the same time. The structure of the carrier basket is various dependent on whether the type of the frame is collapsible or fixed.

1. For the fixed type stroller:

The carrier basket of the stroller of the fixed type is also a fixed basket being screwed or riveted to the frame.

2. For the collapsible type stroller:

The frame of the collapsible stroller is always folded after use for saving the space and therefore cannot be mounted with a basket of fixed type. The carrier basket is usually in the form of a bag being made of soft cloth or net surface in order to fit to the folded state of the frame. A space for storage is formed in the bag when the frame is stretched out, while the tray is folded along with the frame when the frame is folded. There is usually an enclosed pipe rack under the frame for the fixation of the carrier basket. A plurality of buttons are installed around the cloth edge of the bag mouth which covers the pipe rack and clasps the buttons one by one to fix the bag onto the pipe rack.

The structure of the carrier basket according to the stroller of the fixed type is with the carrier basket being mounted to the frame in a fixed way. Because of that, the carrier basket must be used along with the stroller. If the stroller cannot be used temporarily, one have to take other carrier bags to carry the purchased things; when the stroller are to be used again, the user have to put the carrier bags in the carrier basket of the handcart. It is not convenient for use in the position of users.

As for the collapsible stroller, it is necessary for the infant's sitting back to the stroller when the user has finished shopping in sale shops and plans driving home or to other place. While it is not easy for the user to dismember the carrier basket being fixed to the stroller by a plurality of buttons, the user usually takes the purchased things out of the carrier basket and displaces the same into the car, by which the stroller can be folded and displaced into the car. In case that it is necessary to use the stroller again when the parking site is much further away from the user's home or the place he wants to go, the user have to bring the purchased things back to the carrier basket while taking things out of the same to fold the stroller. From the above, the fixation of the carrier basket to the stroller cause much inconvenience on the users. Even though that the user can unbutton the buttons one by one to dismember the carrier basket without the need to take out the things therein, the unbuttoning of the buttons by users is also not convenient; moreover, the carrier basket has already been loaded with things.

Additionally, the pipe rack to which the carrier basket is mounted is a closed type, which makes it difficult to install an easily demountable carrier basket.

SUMMARY OF THE INVENTION

It is the objective of the present invention to provide a fast demountable device applied to the carrier basket of a stroller.

According to the fast demountable device of a stroller disclosed in the present invention, a fixture rack for the fixation of the carrier basket is mounted onto the frame of the stroller with at least three clasp members furnished between the fixture rack and the frame. By the adaptation of at least three clasp members in the relation of 3-point support, the carrier basket can be either fixed onto a clasping position on the frame or moved to a relieving position by the relief from the grasp of the clasp members. Thereby, users can take the carrier basket for the use as the casual carrier bags or the carrier basket can be directly taken out without the need to take the things out of the carrier basket when it is necessary to fold the stroller, which is convenient for users in the need of carrier bags or in case of the need to fold the stroller.

For the full comprehension of the objectives, shape characteristics, and function according to the present invention, it will be further described accompanied with the attached illustrations.

PREFERRED EMBODIMENTS OF THE PRESENT INVENTION

Figure 1:
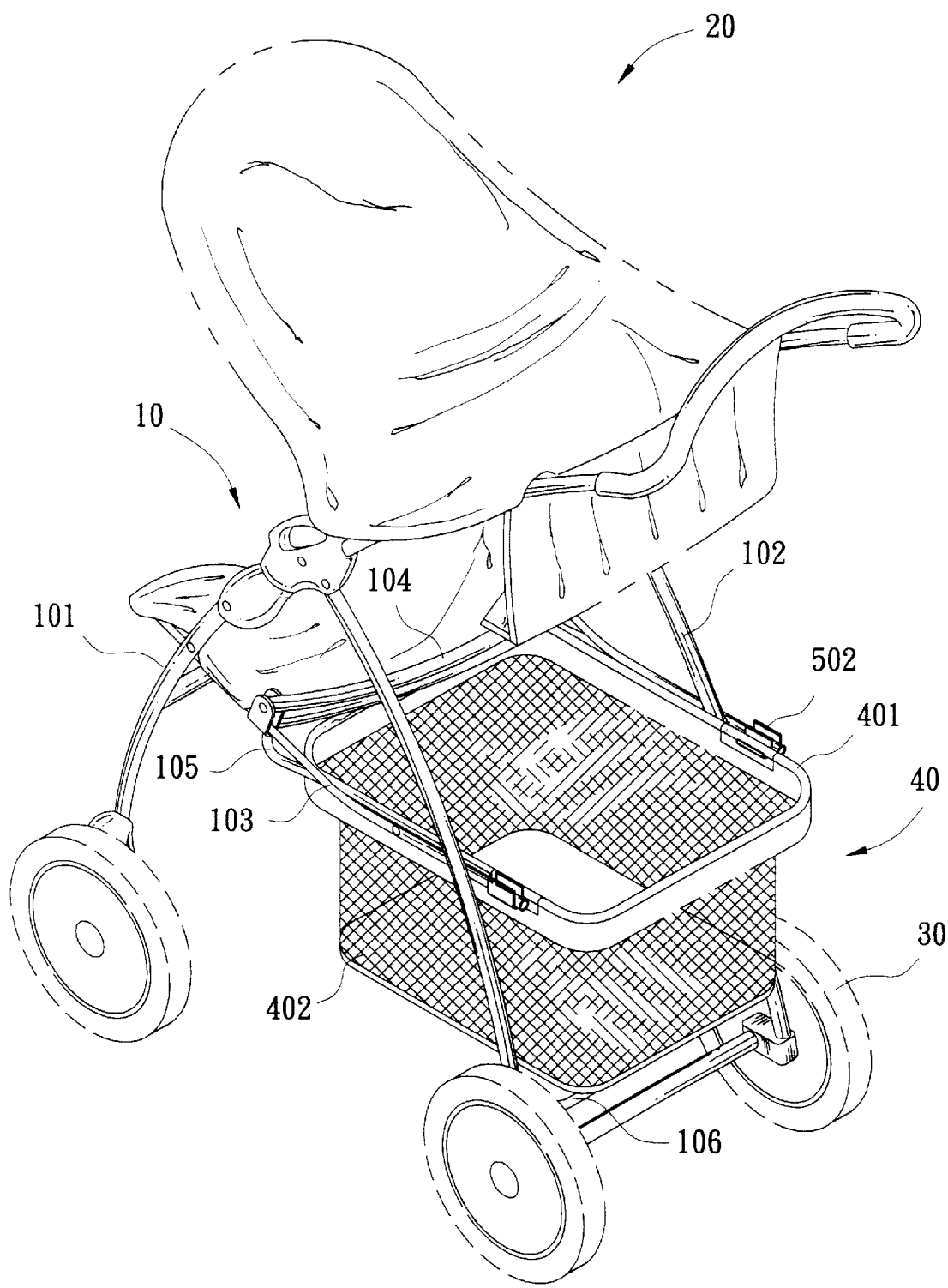
FIG. 1 is the structure illustration of the stroller according to the present invention.

As referring firstly to the FIG. 1, the main structure of the fast demountable device according to the carrier basket of the stroller comprises a frame 10, a seat 20, wheels 30, and carrier basket 40, wherein the frame 10 is consisted of a front frame 101, a rear frame 102, support rack 103, back support 104, and fixture rack 105 for the fixation of the carrier basket 40. All the constituent members are interconnected in pivot to make them collapsible for saving the occupied space. The front frame 101 and the bottom of the rear frame 102 are installed with wheels 30 to facilitate the move of the stroller, while the seat 20 is mounted between the support rack 103 and the back support 104 to provide the room for the infant's sitting. Moreover, the carrier basket 40 is installed beneath the seat 20 in a demountable way to provide the room for the matters purchased by the users.

Figure 2:
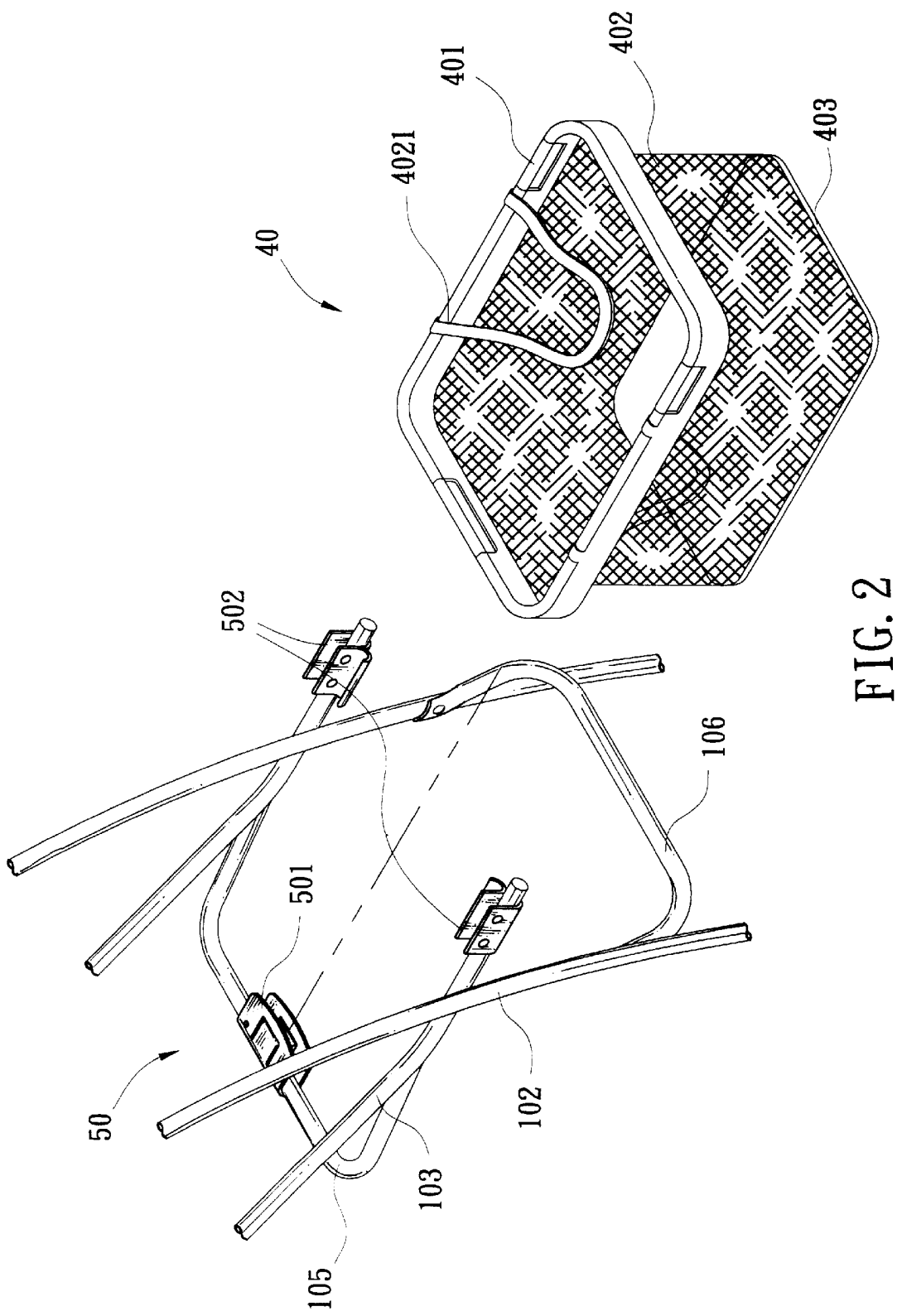
FIG. 2 is the exploding illustrations of the carrier basket and the stroller according to the present invention.

As illustrated by referring to FIG. 2, the carrier basket 40 is consisted of a frame rack 401, a basket body 402, and a tray 403, wherein the frame rack 401 is in a general shape of rectangle and the top of the basket body 402 are covered by the frame rack 401 around the periphery thereof while the bottom of the same is mounted with the tray 403. The basket body 402 is made of soft cloth, web surface or the like so that the basket body 402 can be stretched out to form a storage room for purchased matters by the gravitational drag of the tray 403. Or when the frame 10 is folded, the tray 403 can be close to the frame rack 401 to facilitate the folding of the frame 10 due to the soft characteristic of the basket body 402. Moreover, a carry belt 4021 can be mounted on both sides of the top of the basket body 402 to make itself to be the carrier bag for the user's convenience to hold.

Figure 3:
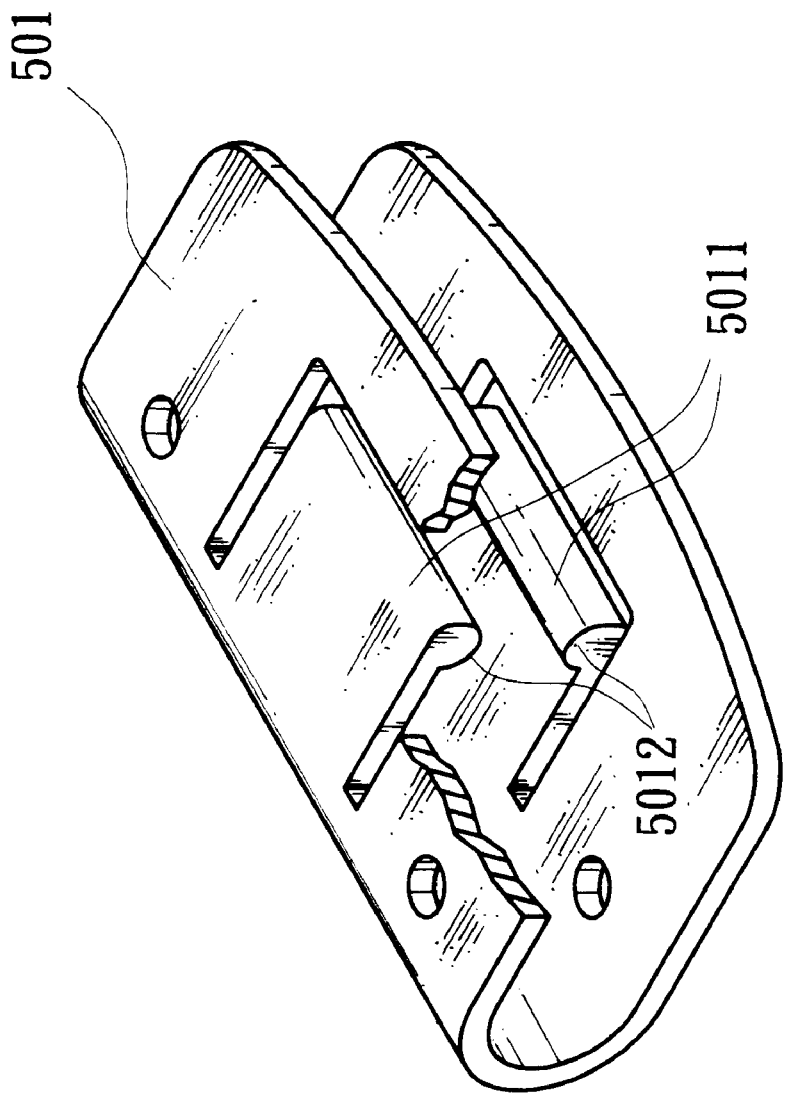
FIG. 3 is the structure illustration of the clasp member according to the present invention.
Figure 5:
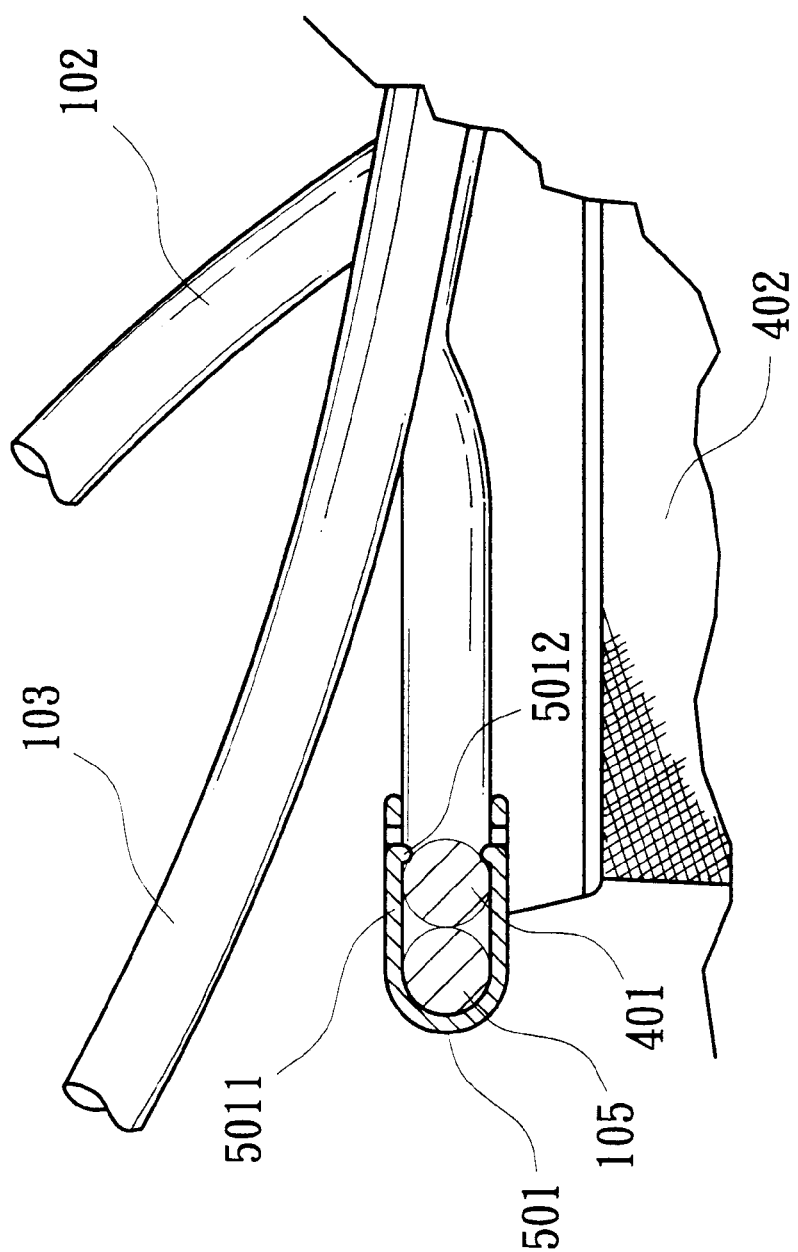
FIG. 5 is the illustration of the cross-sectional view of the stroller and carrier basket assembly according to the present invention.

According to the fast demountable device of the stroller disclosed in the present invention the support rack 103 in the frame 10 is installed between the front frame 101 and the rear frame 102 and the fixture rack 105 for the fixation of the carrier basket is mounted on the two support rack 103 close to the front frame 101 to form an open space on the rear bottom of the frame 10. A fast demountable device 50 mounted on the support rack 103 and the fixture rack 105 comprises a clasp member 501 and at least two clasping carrier member 502, wherein the clasp member 501 is generally an U-shape and transversely clasp the fixture rack 105 and the width of the U-shape is about equal to the periphery of the frame rack 401 in the carrier basket 40. Resilient clasps 5011, shown in FIG. 3, both with a block end 5012 are pressed forming on both sides of the clasp member 501. The frame rack 401 of the carrier basket 40 is hold by the resilient clasps 5011 and blocked to fix by the block ends 5012 when being pushed into the clasp member 501. The frame rack 401 can be out of the confinement of the clasp member 501 when being pulled and slightly exerted in the inverse direction due to the resilient characteristic of the resilient clasp 5011. (As referring to FIG. 5)

Figure 4:
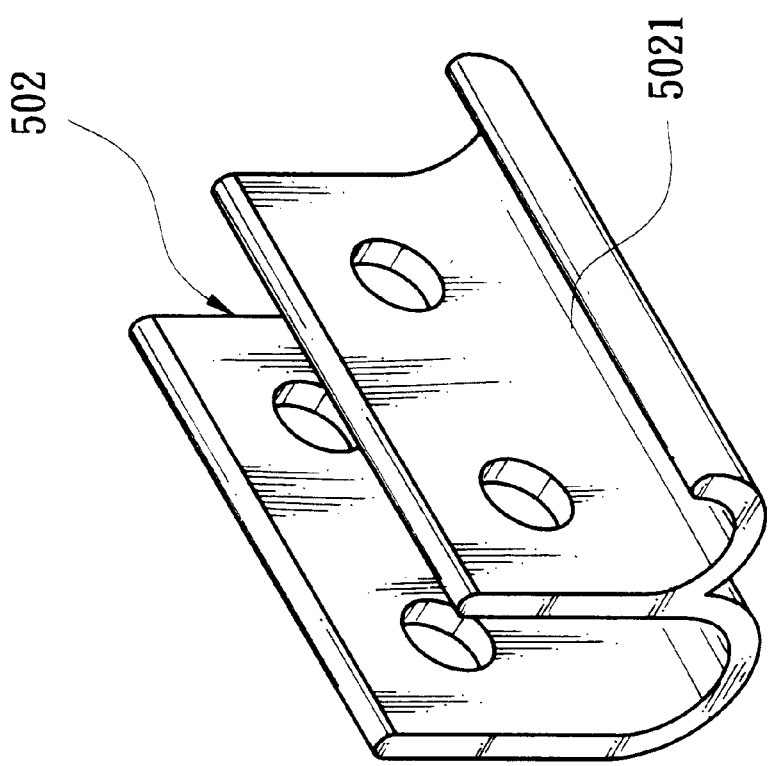
FIG. 4 is the structure illustration of the carrier member according to the present invention.

Please refer to FIG. 4, there are at least two clasping carrier members 502 being mounted on the left and right sides of the support rack 103 respectively, wherein the clasping carrier member 502 is generally in an U-shape and with its open end heading upward to clamp the support rack 103. A support member 5021 extending out from which is close to the inner side of the carrier member on the support rack 103 is used as bearing the frame rack 401 of the carrier basket 40. When the front end of the frame rack 401 in the carrier basket 40 is held by the clasp member 501, both sides of the frame rack 401 can ride on the support member 5021 of the clasping carrier member 502 and thereby the carrier basket 40 can be supported and fixed. For enhancing the support force for the carrier basket 40, a bearing rack 106 can be thus installed on the bottom of the support rack 103 opposite to the carrier basket 40.

When using the stroller, the user can push the front end of the frame rack 401 in the carrier basket 40 onto the clasp member 501 and to be clamped by the same. Both sides of the frame rack 401 are supported by the carrier member 502, which lead to the carrier basket 40's being held in a fixed position and the improvement for the load capacity thereof due to the fixation by at least three points. Moreover, the basket body 402 can be stretched out to form a storage room for purchased matters by the gravitational drag of the tray 403. Also, it is not necessary to dislocate the carrier basket 40 for folding the stroller but just push the tray 403 close to the frame rack 401. Additionally, when the user is necessary to leave the stroller temporarily, all he have to do is pull out the carrier basket 40 with a slight exertion force to cause the frame rack 401 to be free from the confinement by the clasp member 501 and displaced to the relieving position. Therefore, the user can take out the carrier basket 40 with ease and hold the carrying belt 4021 thereof to use it as casual carrier bags. When the user is back, he can push the carrier basket 40 back in the same way. In the meanwhile, the carrier basket in case of being loaded with matters can be pulled out directly without the need to unload the matters therein when the user wants to fold the stroller.

Figure 6:
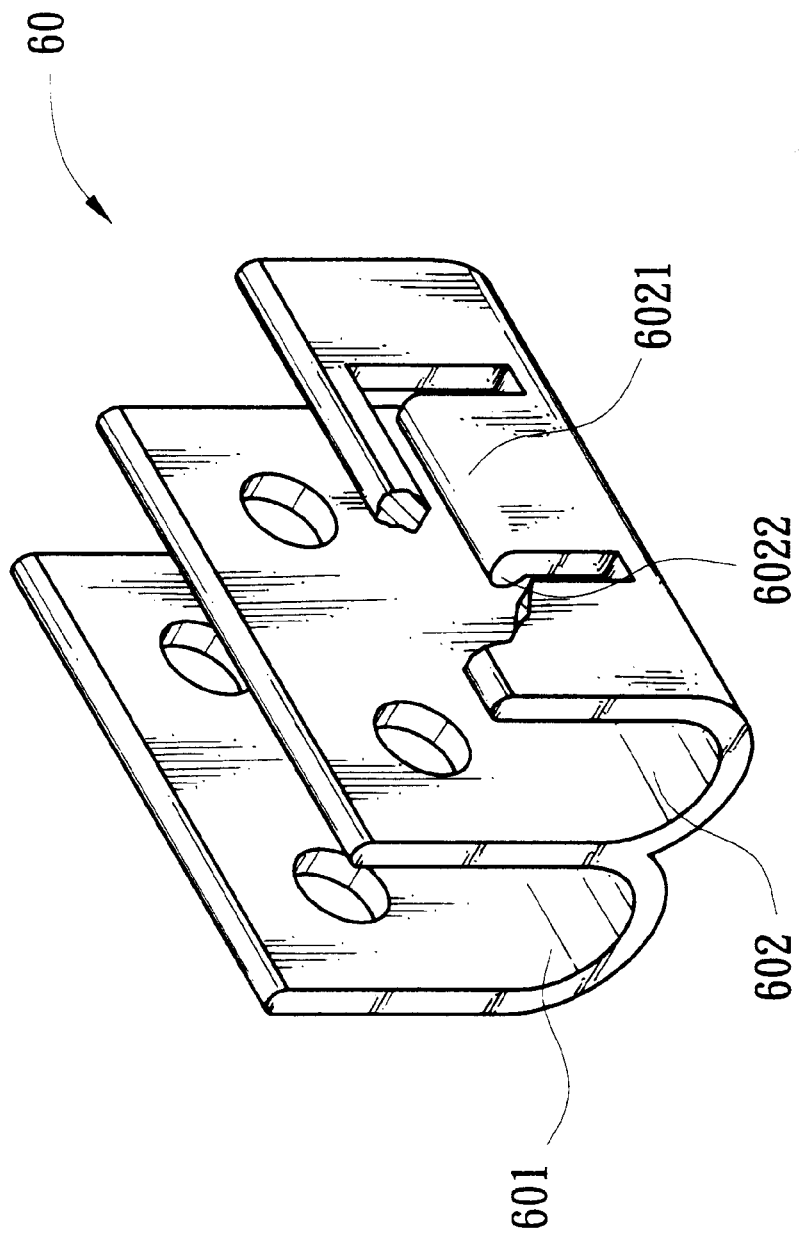
FIG. 6 is an illustrated embodiment of the clasp member and carrier member according to the present invention.

In the embodiment disclosed above, the clasp member 501 transversely clamps to fix onto the fixture rack 105 of the carrier basket 40 being transversely pulled to the clasp member 501. The clasp member 501 and the clasping carrier member 502 are two different structures. While referring to FIG. 6, the second embodiment according to the present invention, the clasp member 501 and the clasping carrier member 502 can be integrated into a single member numerated as a clasp element 60. The clasp element 60 is in a shape of double U and consisted of a fix member 601 and a clamp member 602, wherein the fix member 601 can hoop the support rack 103 or the fixture rack 105 for the carrier basket 40 on the top and the clamp member 602 can accommodate the frame rack 401 of the carrier basket 40 being disposed from upper to under. To provide the fixation of the frame rack 401 of the carrier basket 40 by the clasp element 60, a resilient clasp 6021 with a clamp 6022 installed on the front end thereof can be mounted on the outer side of the clamp member 602. The clasp element 60 can be disposed on the same place where the clasp member 501 and the clasping carrier member 502 are disposed in the previous embodiment to fix the carrier basket 40 onto the frame 10 with at least three points support, which can also save the molding expenditure due to the integration of three different members into one.

The assembly structure for the seat of an stroller as disclosed according to the present invention can install the carrier basket to the stroller in a demountable way, which provides users with more conveniences in use.

While there is shown an described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fast demountable device for use in a carrier basket of a stroller comprising: a frame, a carrier basket, and a fast demountable structure mounted on said frame for clamping and fixing said carrier basket, wherein said fast demountable structure comprises:
   a clasp member for clasping a front end of a periphery of said carrier basket to either hold said carrier basket in a fixed position or relief said carrier basket from clasping under an exerted force;
   at least two carrier members for bearing both ends of the periphery of said carrier basket and working with said clasp member to support said carrier basket by at least three points.

2. The fast demountable device according to claim 1, wherein said frame comprises a front frame, a seat, support frame, and back frame.

3. The fast demountable device according to claim 1, wherein said frame comprises a fixture rack and a bearing rack.

4. The fast demountable device according to claim 1 wherein said carier basket comprises:

a frame rack in a general shape of a rectangle;

a basket body covering around the periphery of said frame rack on the top; and a tray on the bottom of said basket body forming a storage space with said basket body.

5. The fast demountable device according to claim 4 wherein said basket body is made of soft cloth or web surface.

6. The fast demountable device according to claim 4, wherein said basket body comprises a carrying belt.

7. The fast demountable device according to claim 1, wherein said clasp member is mounted on said fixture rack and comprises a resilient clasp.

8. The fast demountable device according to claim 7, wherein said resilient clasp comprises a block end.

9. The fast demountable device according to claim 1, wherein said carrier member is mounted on said support rack and comprises a support member.

* * * * *